(12) United States Patent
Chen et al.

(10) Patent No.: US 8,588,831 B2
(45) Date of Patent: Nov. 19, 2013

(54) METHOD AND BASE STATION FOR SENDING INFORMATION

(75) Inventors: De Chen, Shenzhen (CN); Jiping Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 243 days.

(21) Appl. No.: 13/106,272

(22) Filed: May 12, 2011

(65) Prior Publication Data

US 2011/0212742 A1 Sep. 1, 2011

Related U.S. Application Data

(63) Continuation of application No. PCT/CN2009/074957, filed on Nov. 16, 2009.

(30) Foreign Application Priority Data

Nov. 14, 2008 (CN) .......................... 2008 1 0217322

(51) Int. Cl.
*H04W 24/04* (2009.01)

(52) U.S. Cl.
USPC ............ 455/507; 455/522; 455/515; 455/220

(58) Field of Classification Search
USPC ......... 455/507, 436, 450, 574, 425, 515, 420, 455/115.1, 522, 124, 220; 370/311, 254, 370/329, 395.4, 235, 236, 328
See application file for complete search history.

(56) References Cited

U.S. PATENT DOCUMENTS

| 7,062,226 | B2 | 6/2006 | Lee et al. | |
|---|---|---|---|---|
| 8,169,956 | B2 * | 5/2012 | Malladi | ......................... 370/329 |
| 2005/0124373 | A1 | 6/2005 | Marinier | |
| 2007/0066329 | A1 | 3/2007 | Laroia et al. | |
| 2008/0167089 | A1 * | 7/2008 | Suzuki et al. | .................. 455/574 |
| 2008/0186892 | A1 * | 8/2008 | Damnjanovic | ................ 370/311 |
| 2008/0267105 | A1 * | 10/2008 | Wang et al. | .................... 370/311 |
| 2009/0238098 | A1 * | 9/2009 | Cai et al. | ........................ 370/254 |
| 2009/0253470 | A1 * | 10/2009 | Xu | .................. 455/574 |
| 2010/0113023 | A1 * | 5/2010 | Huang et al. | ................... 455/436 |
| 2010/0120429 | A1 * | 5/2010 | Kazmi et al. | .................... 455/436 |

(Continued)

FOREIGN PATENT DOCUMENTS

| CN | 10143753 | 9/2007 |
|---|---|---|
| CN | 101170726 A | 4/2008 |

(Continued)

OTHER PUBLICATIONS

Written Opinion of the International Searching Authority issued Mar. 4, 2010 in corresponding International Patent Application No. PCT/CN2009/074957.
First Chinese Office Action issued Jul. 2, 2012 in corresponding Chinese Patent Application No. 200810217322.6.
Extended European Search Report dated Mar. 28, 2012 issued in corresponding European Patent Application No. 09825777.7.

(Continued)

*Primary Examiner* — Tan Trinh
(74) *Attorney, Agent, or Firm* — Staas & Halsey LLP

(57) ABSTRACT

The present invention relates to mobile communication technologies, and in particular, to a method, base station and system for sending information. The method includes: obtaining discontinuous reception (DRX) parameter of a terminal; determining discontinuous transmission (DTX) parameter of the base station according to the DRX parameter; and sending pilot and broadcast information periodically according to the DTX parameter. The technical solution under the present invention saves time-frequency resources, reduces interference on neighboring cells, and saves electric power.

15 Claims, 12 Drawing Sheets

(56) References Cited

U.S. PATENT DOCUMENTS

| | | | | |
|---|---|---|---|---|
| 2010/0184443 | A1* | 7/2010 | Xu | 455/450 |
| 2010/0255835 | A1* | 10/2010 | Suzuki et al. | 455/425 |
| 2012/0140691 | A1* | 6/2012 | Wu | 370/311 |

FOREIGN PATENT DOCUMENTS

| | | | |
|---|---|---|---|
| CN | 101193417 | A | 6/2008 |
| CN | 101297565 | A | 10/2008 |
| WO | 02/01887 | A2 | 1/2002 |
| WO | 2007/073118 | | 6/2007 |
| WO | 2007/111480 | A1 | 10/2007 |
| WO | 2008/069950 | A2 | 6/2008 |

OTHER PUBLICATIONS

QUALCOMM Europe, "Signalling in support of DTX/DRX", 3GPP TSG-RAN WG1, Meeting #45, May 2006, pp. 1-11.

NTT DoCoMo, Inc., "Views on DRX/DTX control in LTE", 3GPP TSG-RAN WG2, Meeting #56, Nov. 2006, pp. 1-3.

NTT DoCoMo, Inc., "LTE_Active DRX control", 3GPP TSG-RAN WG2, Meeting #57, Feb. 2007, pp. 1-2.

"3$^{rd}$ Generation Partnership Project; Technical Specification Group Radio Access Network; Continuous connectivity for packet data users (Release 7)", 3GPP TR 25.903 V7.0.0, Mar. 2007, pp. 1-138.

International Search Report, mailed Mar. 4, 2010, in corresponding International Application No. PCT/CN2009/074957 (4 pp.).

\* cited by examiner

US 8,588,831 B2

METHOD AND BASE STATION FOR SENDING INFORMATION

CROSS-REFERENCE TO RELATED APPLICATIONS

This application is a continuation of International Application No. PCT/CN2009/074957, filed on Nov. 16, 2009, which claims priority to Chinese Patent Application No. 200810217322.6, filed on Nov. 14, 2008, both of which are hereby incorporated by reference in their entireties.

FIELD OF THE INVENTION

The present invention relates to the field of mobile communication technologies, and in particular, to a method and base station for sending information.

BACKGROUND OF THE INVENTION

Power consumption of a mobile terminal is always a bottleneck of mobile communication technologies. To reduce battery consumption, a terminal that carries out a non-real-time service generally employs a discontinuous reception (DRX) mode. When the service data received by the terminal does not arrive continuously, but arrives with regular periods, a DRX period adaptable to the service data can be configured on the terminal according to this service characteristic, namely, the characteristic of regular arrival of the service data. The DRX period involves two states: DRX receiving state and DRX sleep state. When the terminal is in the DRX receiving state, the terminal starts the transceiver to monitor the service data and control information sent by the base station, and the pilot and broadcast information periodically sent by the base station. When the terminal is in the DRX sleep state, the terminal shuts down the transceiver, and stops monitoring the service data and control information sent by the base station, and the pilot and broadcast information periodically sent by the base station.

A Femto cell is a solution to extending indoor coverage of mobile communication. A Femto cell is installed in a small coverage environment, in which a user initiates voice or data calls through a mobile device such as a mobile phone or a notebook computer. The Femto cell transmits the voice or data calls initiated through the mobile phone or notebook computer to a $3^{rd}$ Generation (3G) core network which is based on a standard interface. The home access point of a Femto cell is capable of plug-and-play and connectable to any existing Internet Protocol (IP)-based transport networks, and may take the place of a fixed bandwidth access device of households or small enterprises. Therefore, a Femto cell is also known as a home base station.

SUMMARY OF THE INVENTION

Embodiments of the present invention provide a method and base station for sending information. Through the technical solution put forward herein, the base station employs a discontinuous transmission (DTX) mode to save time-frequency resources, reduce interference on neighboring cells, and reduce the power consumption.

According to one aspect, a method for sending information is provided, where the method includes:
 obtaining a DRX parameter of a terminal;
 determining a DTX parameter of a base station according to the DRX parameter; and
 sending pilot and broadcast information periodically according to the DTX parameter.

According to another aspect, a base station is provided, where the base station includes:
 an obtaining module, configured to obtain a DRX parameter of a terminal; and
 a determining module, configured to determine a DTX parameter of the base station according to the DRX parameter.

In a home base station environment, after the base station obtains the DRX parameter of the terminal, the base station determines the DTX parameter of the base station according to the DRX parameter, and sends pilot and broadcast information periodically according to the DTX parameter. After the base station enters the DTX mode, if all user terminals served by the home base station are in the DRX sleep mode, the base station also enters the DTX sleep period. That is, the base station sends no pilot or broadcast information and shuts down the transceiver, thus saving power and time-frequency resources, reducing interference on neighboring cells, and reducing the power consumption.

DETAILED DESCRIPTION OF THE EMBODIMENTS

To make the objectives, technical solution and merits of the present invention clearer, the following describes the embodiments of the present invention in more detail with reference to the accompanying drawings. Evidently, the embodiments described herein are only part of rather than all of the embodiments. All other embodiments, which can be derived by those skilled in the art from the embodiments given herein without creative effort, shall fall within the protection scope of the present invention.

When all terminals are in the DRX mode, the base station enters the DTX mode, thus saving power and time-frequency resources reducing interference on neighboring cells and reducing the power consumption.

Figure 1:
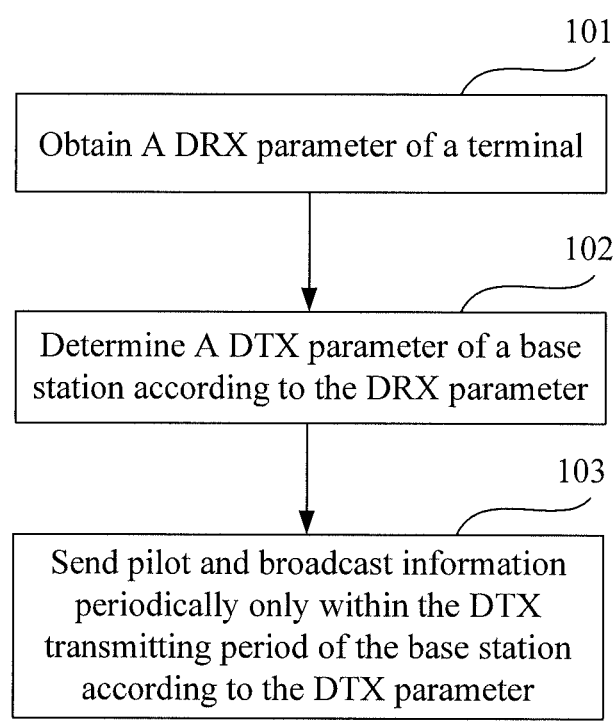
FIG. 1 is a schematic diagram of a flowchart of a method for sending information according to one embodiment of the present invention.

FIG. 1 is a schematic diagram of a flowchart of a method for sending information according to one embodiment of the present invention. The method includes the following steps.

101: Obtain a DRX parameter of a terminal.

102: Determine a DTX parameter of a base station according to the DRX parameter.

103: Send pilot and broadcast information periodically according to the DTX parameter.

Through the foregoing steps, time-frequency resources are saved, interference on neighboring cells is reduced, and power consumption is reduced.

The step of determining a DTX parameter of the base station according to the DRX parameter includes:

adjusting or confirming the DRX parameter of the terminal; and determining DTX transmitting period and DTX receiving period of the base station according to the adjusted or confirmed DRX parameter.

Before adjusting or confirming the DRX parameter of the terminal, the method includes the following contents.

The base station confirms the DRX parameter of the terminal if the following conditions are fulfilled: The DRX period parameter of the terminal is the same as that of other terminal which is already in the DRX mode, and DRX bias parameter of the terminal is different from the DRX bias parameter of other terminal which is already in the DRX mode; or, the DRX period parameter of the terminal is different from that of other terminal which is already in the DRX mode.

The base station needs to adjust DRX bias parameter of the terminal, namely, map the DRX bias of the terminal to a DRX bias not occupied by other terminal, if the following conditions are fulfilled: The DRX period parameter sent by the terminal is the same as that of other terminal which is already in the DRX mode, and the DRX bias parameter of the terminal is also the same as that of other terminal which is already in the DRX mode.

The base station may also adjust the periods and DRX biases parameter of all terminals uniformly to a continuous time segment, so that all terminals have the same DRX period, and that the DRX biases of all terminals are adjacent to each other but not overlapped.

The content of determining the DTX transmitting period and receiving period of the base station according to the adjusted or confirmed DRX parameter includes that:

the base station adjusts its own DTX transmitting period and sleep period according to the adjusted or confirmed DRX parameter of all terminals, so that receiving periods of all terminals fall within the transmitting period of the base station.

In a home base station environment, after the base station obtains the DRX parameter of the terminal, the base station determines the DTX parameter of the base station according to the DRX parameter, and enters the DTX mode. The base station sends pilot and broadcast information periodically within the DTX transmitting period of the base station according to the DTX parameter. When all users served by the home base station are in the DRX sleep mode, the base station enters the DTX sleep mode. That is, the base station sends no pilot or broadcast information and shuts down the transceiver, thus saving power and time-frequency resources, reducing interference on neighboring cells, and reducing the power consumption.

Figure 2:
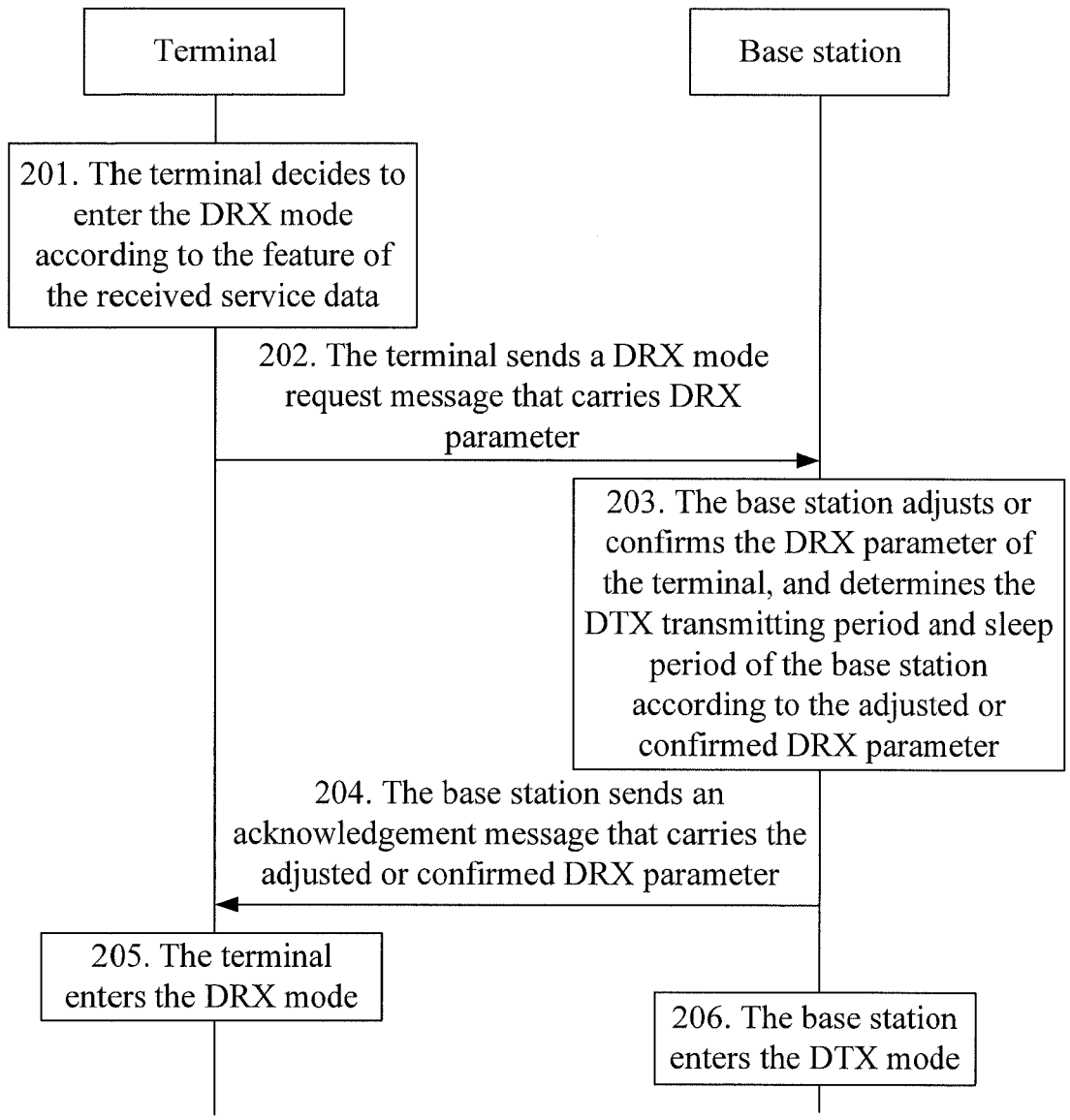
FIG. 2 is a schematic diagram of a flowchart of a method for sending information according to another embodiment of the present invention.

FIG. 2 is a schematic diagram of a flowchart of a method for sending information according to another embodiment of the present invention. The method includes the following steps.

201: The terminal decides to enter the DRX mode according to characteristic of the received service data.

When the service data received by the terminal does not arrive continuously, but arrives with regular and periods, the terminal configures a DRX period adaptable to the service data according to the characteristic of regular and periodical arrival of the service data.

202: The terminal sends a DRX mode request message that carries a DRX parameter to the base station.

The request message carries parameter such as the DRX period and the DRX bias of the terminal.

203: The base station adjusts or confirms the DRX parameter of the terminal, and determines the DTX transmitting period and DTX sleep period of the base station according to the adjusted or confirmed DRX parameter.

The base station receives the period parameter and the DRX bias parameter sent by the terminal, and compares the received period parameter and the DRX bias parameter.

Figure 3:
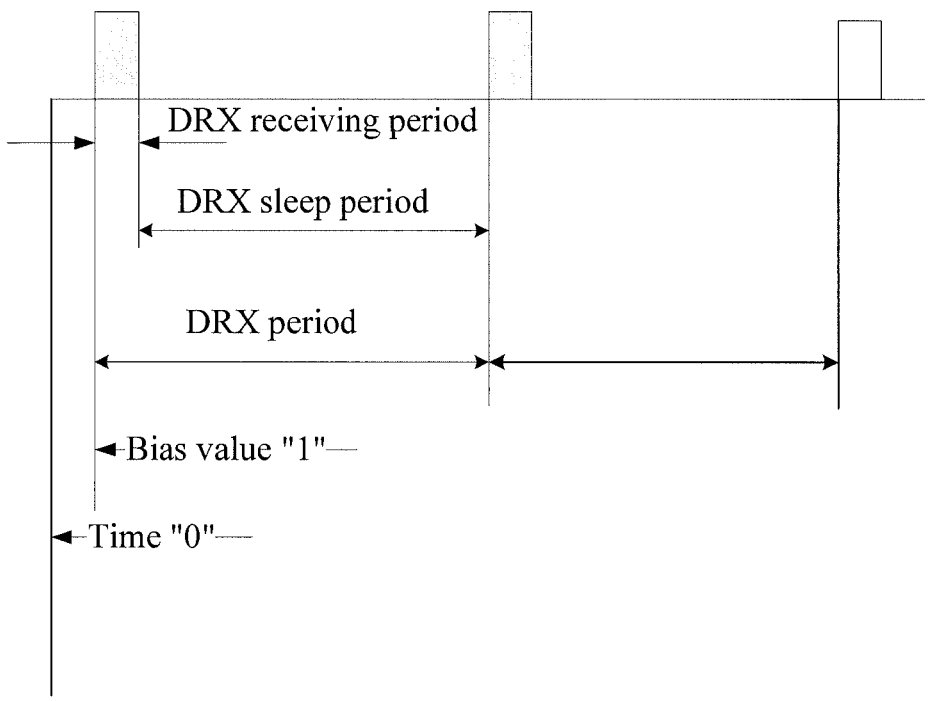
FIG. 3 is a schematic diagram of DRX parameter of terminal 1 that are with the same period according to another embodiment of the present invention.
Figure 4:
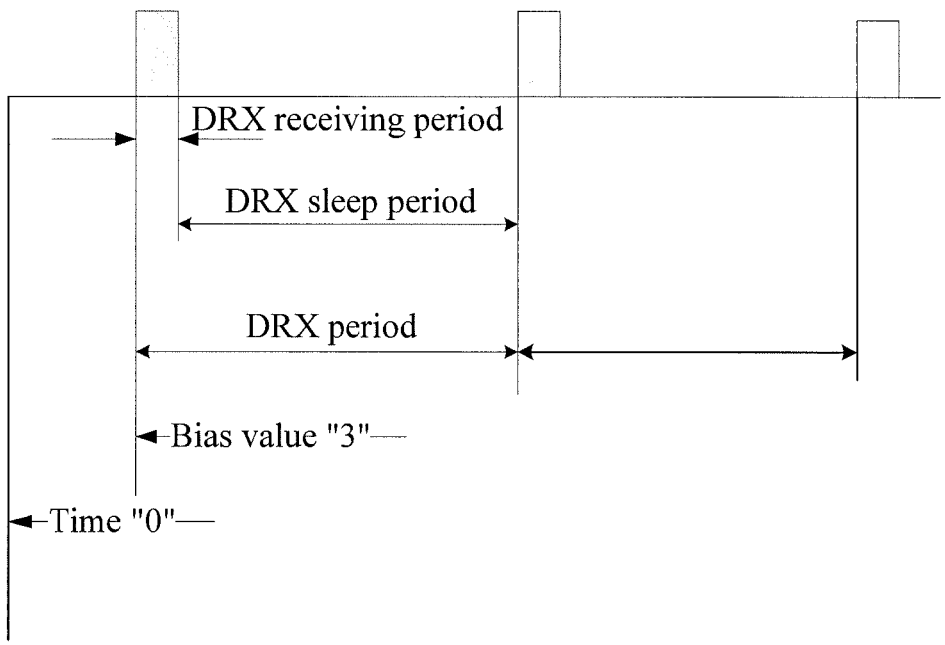
FIG. 4 is a schematic diagram of DRX parameter of terminal 2 that are with the same period according to another embodiment of the present invention.
Figure 5:
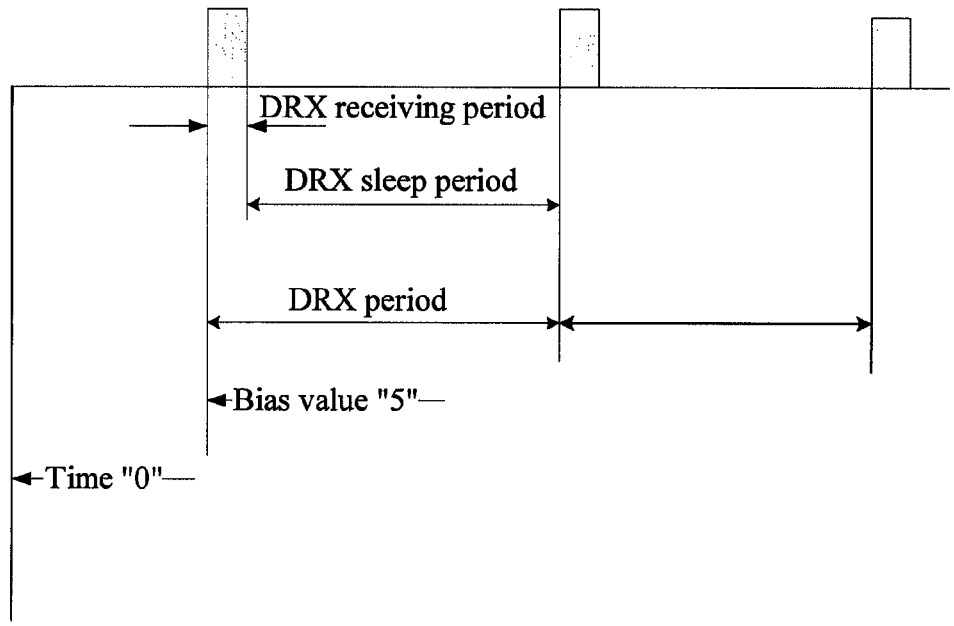
FIG. 5 is a schematic diagram of DRX parameter of terminal 3 that are with the same period according to another embodiment of the present invention.

The base station does not need to adjust, but only needs to confirm, the period parameter and the DRX bias parameter, if the following conditions are fulfilled: The DRX period parameter of the terminal is the same as that of other terminal which is already in the DRX mode, and the DRX bias parameter of the terminal is different from that of other terminal which is already in the DRX mode; or, the DRX period parameter of the terminal is different from that of other terminal which is already in the DRX mode. The details are described below:

FIG. 3, FIG. 4, and FIG. 5 respectively show terminal 1, terminal 2 and terminal 3 that are in the DRX mode. The period parameter is the same but the DRX bias parameter varies with terminal 1, terminal 2 and terminal 3. The base station does not adjust, but confirms, the DRX period parameter and the DRX bias parameter of the terminals.

The base station needs to adjust the DRX bias of the current terminal, namely, map the DRX bias of the current terminal to the DRX bias not occupied by other terminal, if the following conditions are fulfilled: The DRX period parameter sent by the terminal is the same as the period parameter of other terminal which is already in the DRX mode, and other DRX bias parameter of the current terminal is also the same as the DRX bias parameter of the terminal which is already in the DRX mode. The details are described below.

Figure 7:
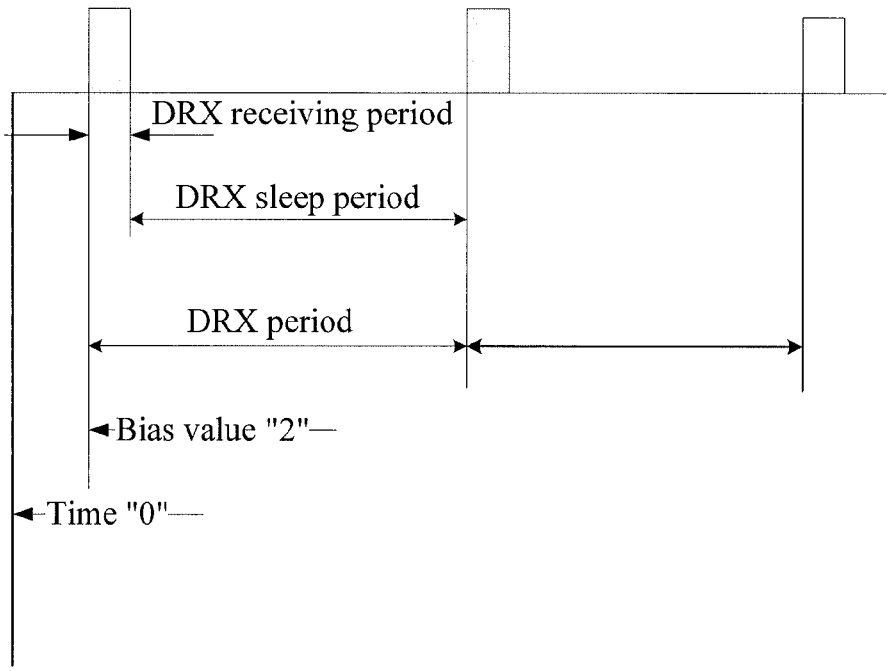
FIG. 7 is a schematic diagram of DRX parameter of terminal 1 that are with the same bias according to another embodiment of the present invention.
Figure 8:
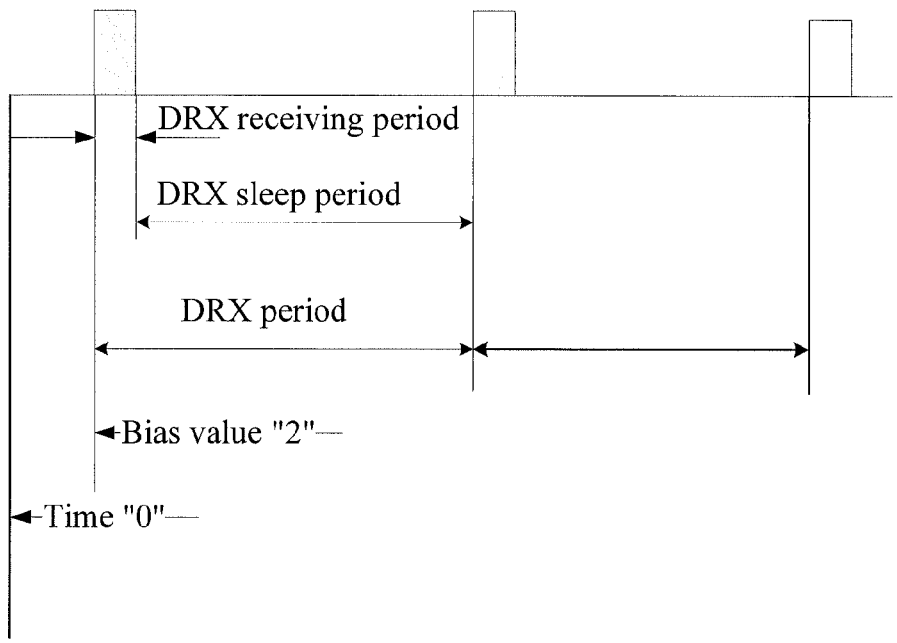
FIG. 8 is a schematic diagram of DRX parameter of terminal 2 that are with the same bias according to another embodiment of the present invention.
Figure 9:
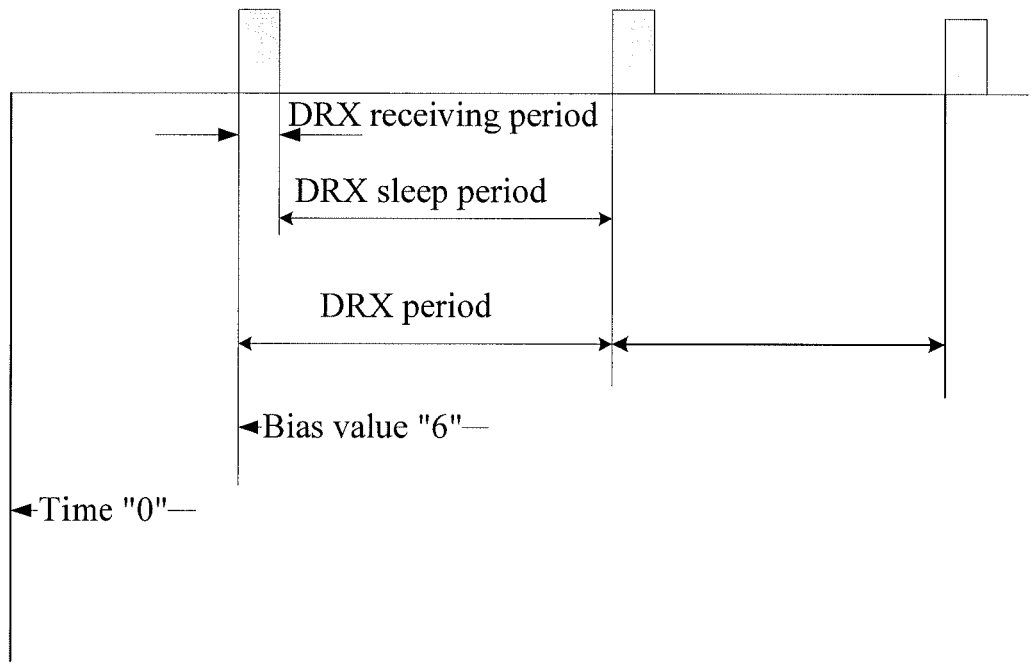
FIG. 9 is a schematic diagram of DRX parameter of terminal 3 that are with different biases according to another embodiment of the present invention.
Figure 10:
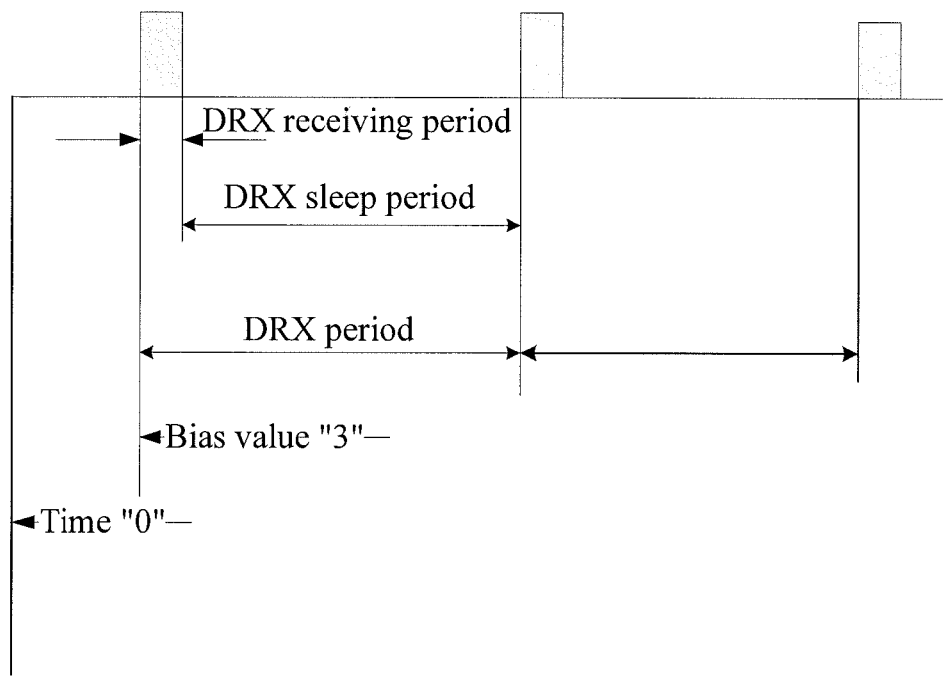
FIG. 10 is a schematic diagram about how a base station adjusts biased DRX parameter of terminal 2 according to another embodiment of the present invention.

FIG. 7, FIG. 8, and FIG. 9 show respectively terminal 1, terminal 2 and terminal 3 that are in the DRX mode. The DRX bias parameter of terminal 1 and terminal 2 are both "1". Therefore, the DRX bias parameter of terminal 2 needs to be adjusted so that it is different from the DRX bias parameter of terminal 1 which is already in the DRX mode. As shown in FIG. 10, the DRX bias parameter of terminal 2 is adjusted from "1" to "3".

Figure 6:
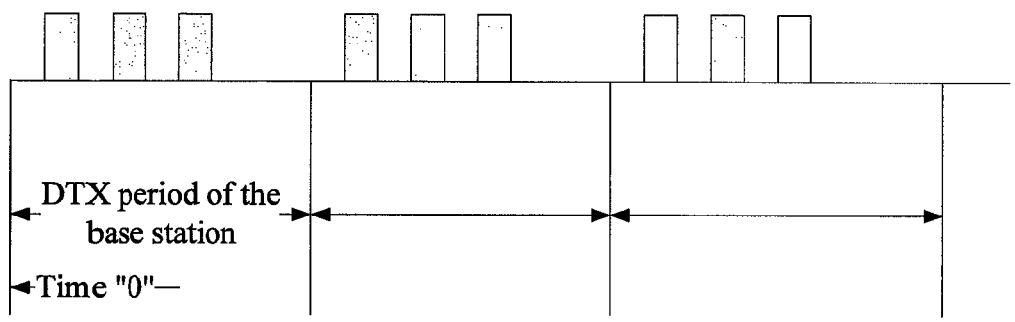
FIG. 6 is a schematic diagram about how a base station adjusts the base station's own DTX transmitting period and sleep period according to another embodiment of the present invention.

If the base station needs to only confirm the period parameter and the DRX bias parameter of the terminal, the base station adjusts its own DTX transmitting period and DTX sleep period according to the DRX parameter of all terminals, so that the receiving periods of all terminals fall within the transmitting period of the base station, as shown in FIG. 6.

Figure 11:
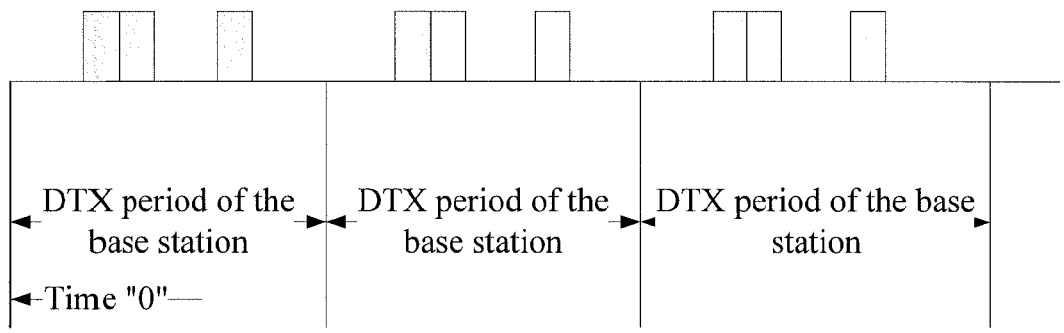
FIG. 11 is a schematic diagram about how a base station adjusts the base station's own DTX transmitting period and sleep period according to another embodiment of the present invention.

If the base station needs to adjust the period parameter and the DRX bias parameter of the terminal, the base station adjusts its own DTX transmitting period and DTX sleep period according to the adjusted DRX period parameter and the DRX bias parameter of all terminals, so that the receiving periods of all terminals fall within the transmitting period of the base station, as shown in FIG. 11.

If any terminal is in the DRX receiving period, the base station is in the DTX transmitting period; when all terminals are in the DRX sleep period, the base station enters the DTX sleep period.

204: The base station sends an acknowledgement message that carries the adjusted or confirmed DRX parameter.

The base station sends a DRX mode acknowledgement message to the terminal. The message carries the adjusted or confirmed a DRX parameter such as the period and the DRX bias.

205: The terminal enters the DRX mode.

After receiving the acknowledgement message sent by the base station, the terminal enters the DRX mode according to the DRX period parameter and the DRX bias parameter carried in the acknowledgement message.

206: The base station enters the DTX mode, and sends pilot and broadcast information periodically within the DTX transmitting period of the base station.

The base station enters the DTX mode according to the adjusted or confirmed DRX parameter of all terminals. If any terminal is in the DRX receiving period, the base station is in the DTX transmitting period.

When the terminal is in the DRX receiving period and the base station is in the DTX transmitting period, the base station sends service data and control information to the terminal, and sends pilot and broadcast information periodically.

When all terminals are in the DRX sleep period, the base station enters the DTX sleep period, shuts down the transceiver, stops sending data, and buffers the service data and control information. When the terminal gets into the DRX receiving period, the base station resumes sending of the buffered service data and control information. The base station only needs to adjust or confirm the DRX period parameter and the DRX bias parameter of each terminal simply without additional operations like adjusting the period or bias, thus saving power and time-frequency resources.

Figure 12:
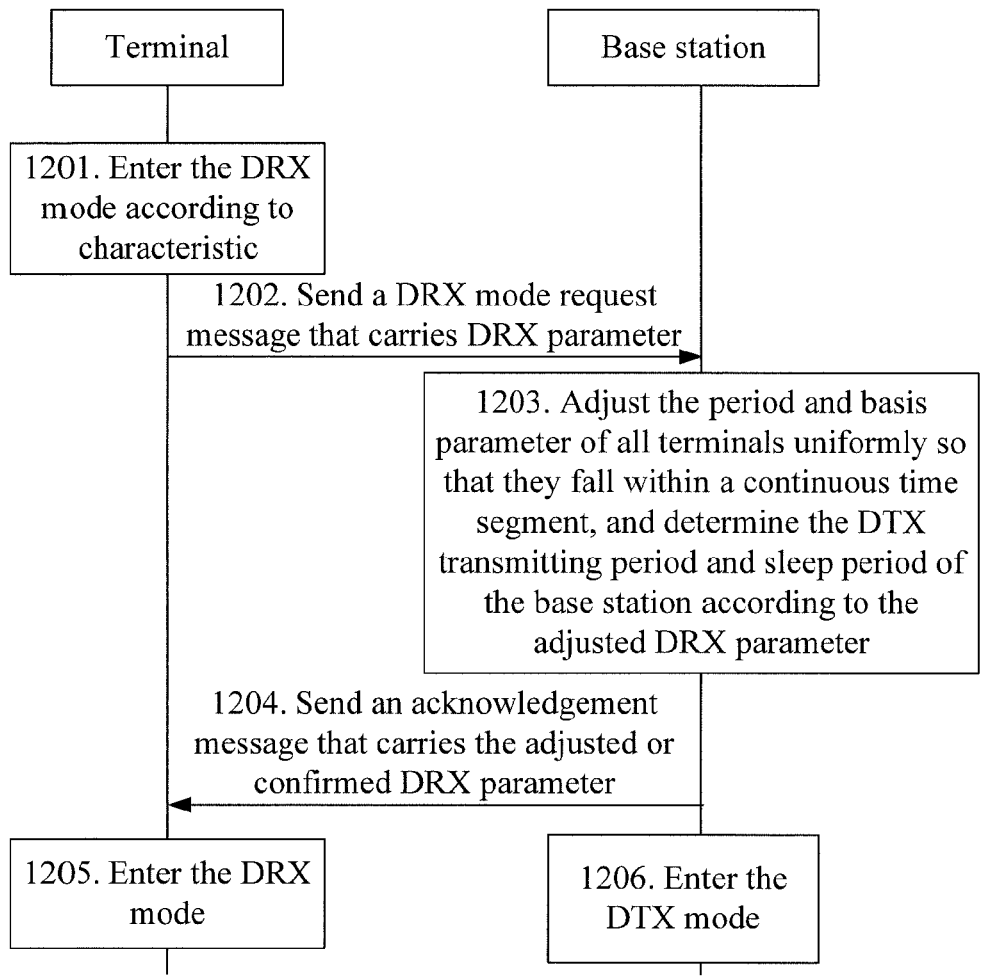
FIG. 12 is a schematic diagram of a flowchart of a method for sending information according to another embodiment of the present invention.

FIG. 12 is a schematic diagram of a flowchart of a method for sending information according to an embodiment of the present invention. The method includes the following steps:

Steps 1201 and 1202 are respectively similar to steps 101 and 102 in the previous embodiment.

1203: The base station adjusts the periods and bias parameter of all terminals uniformly so that they fall within a continuous time segment, and determines the DTX transmitting period and sleep period of the base station according to the adjusted DRX parameter.

Figure 13:
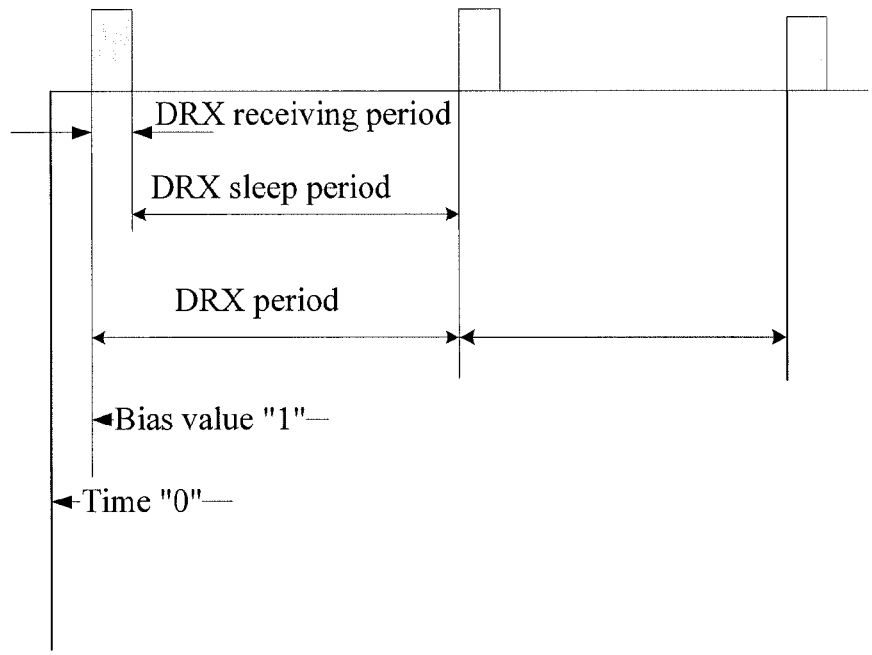
FIG. 13 is a schematic diagram of DRX parameter of terminal 4 according to another embodiment of the present invention.
Figure 14:
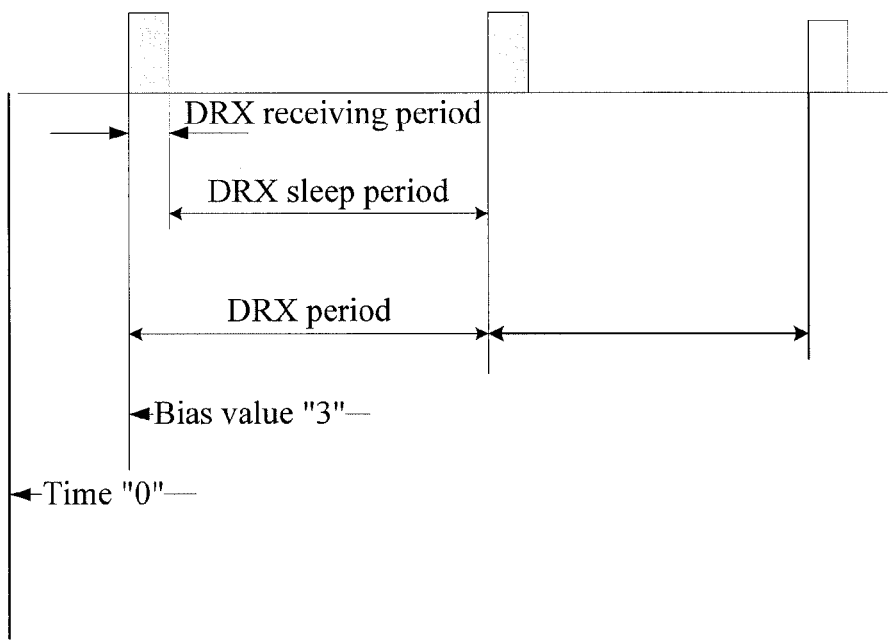
FIG. 14 is a schematic diagram of DRX parameters of terminal 5 according to another embodiment of the present invention.
Figure 15:
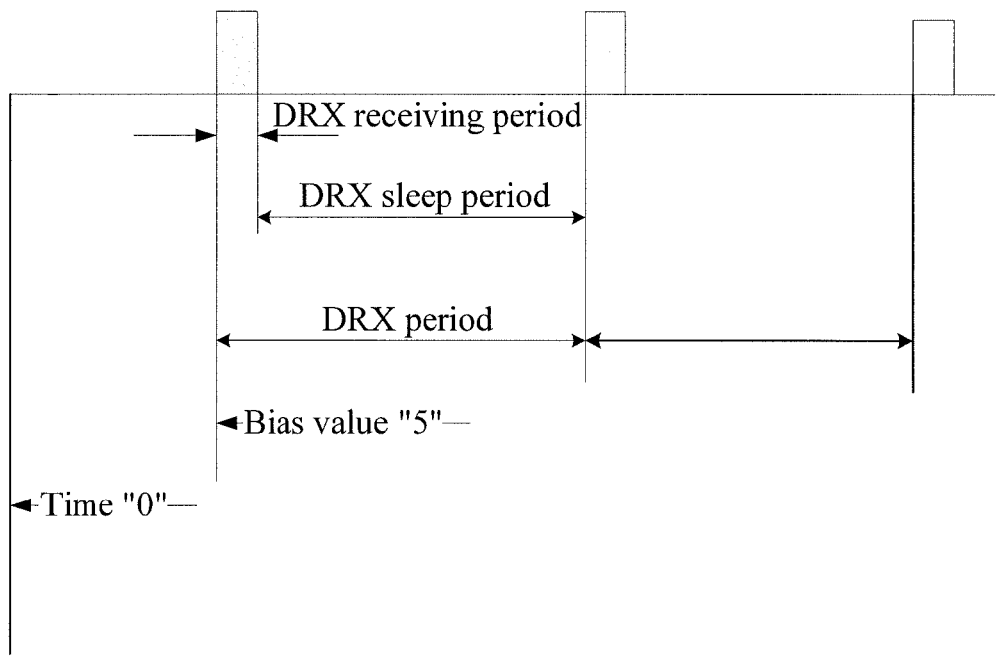
FIG. 15 is a schematic diagram of DRX parameter of terminal 6 according to another embodiment of the present invention.
Figure 16:
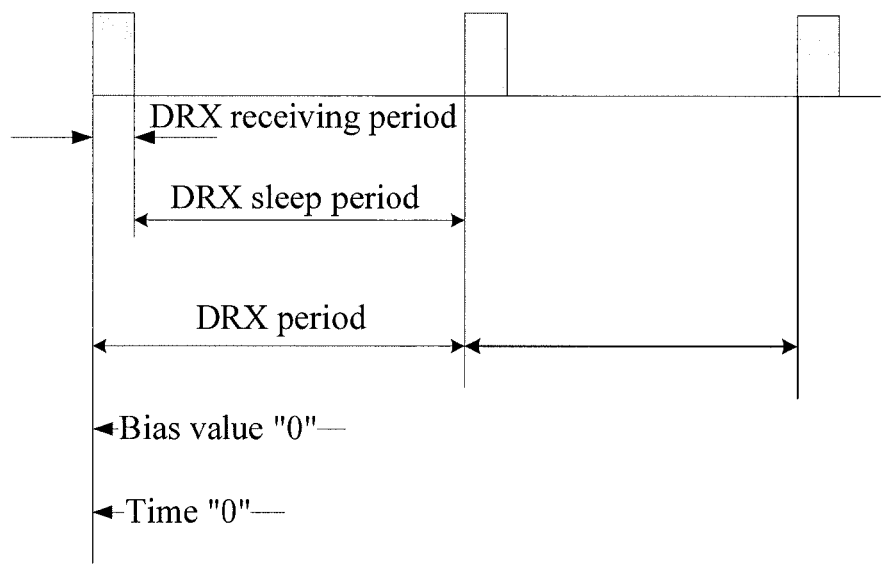
FIG. 16 is a schematic diagram of DRX parameters of terminal 4 that are adjusted by a base station according to another embodiment of the present invention.
Figure 17:
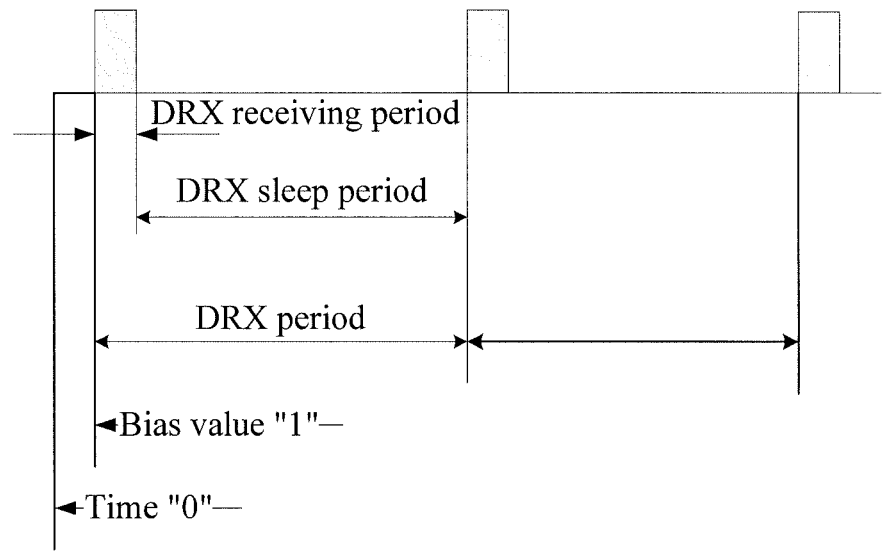
FIG. 17 is a schematic diagram of DRX parameter of terminal 5 that are adjusted by a base station according to another embodiment of the present invention.
Figure 18:
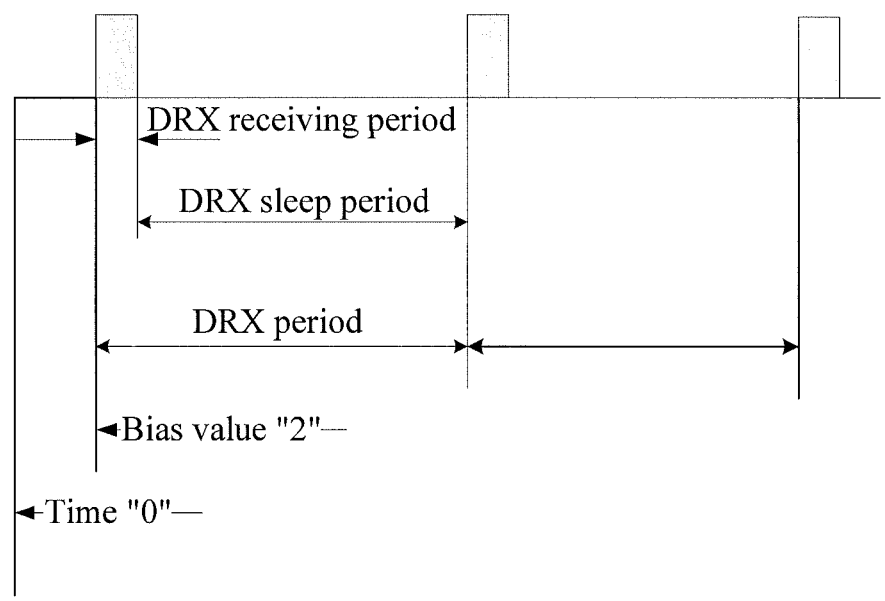
FIG. 18 is a schematic diagram of DRX parameter of terminal 6 that are adjusted by a base station according to another embodiment of the present invention.

The base station adjusts the DRX period of each terminal to the same value, and adjusts the DRX period parameter and the DRX bias parameter of all terminals, so that they fall within a continuous time segment, and that the biases of all terminals are adjacent to each other but not overlapped. The details are described below:

FIG. 13, FIG. 14, and FIG. 15 respectively show terminal 4, terminal 5 and terminal 6 that are in the DRX mode. The base station adjusts the DRX periods of terminal 4, terminal 5 and terminal 6 to the same value, and adjusts the DRX period parameter and the DRX bias parameter of all terminals, so that they fall within a continuous time segment, and that the biases of all terminals are adjacent to each other but not overlapped. The adjusted DRX biases of terminal 4, terminal 5 and terminal 6 are respectively shown in FIG. 16, FIG. 17 and FIG. 18.

Figure 19:
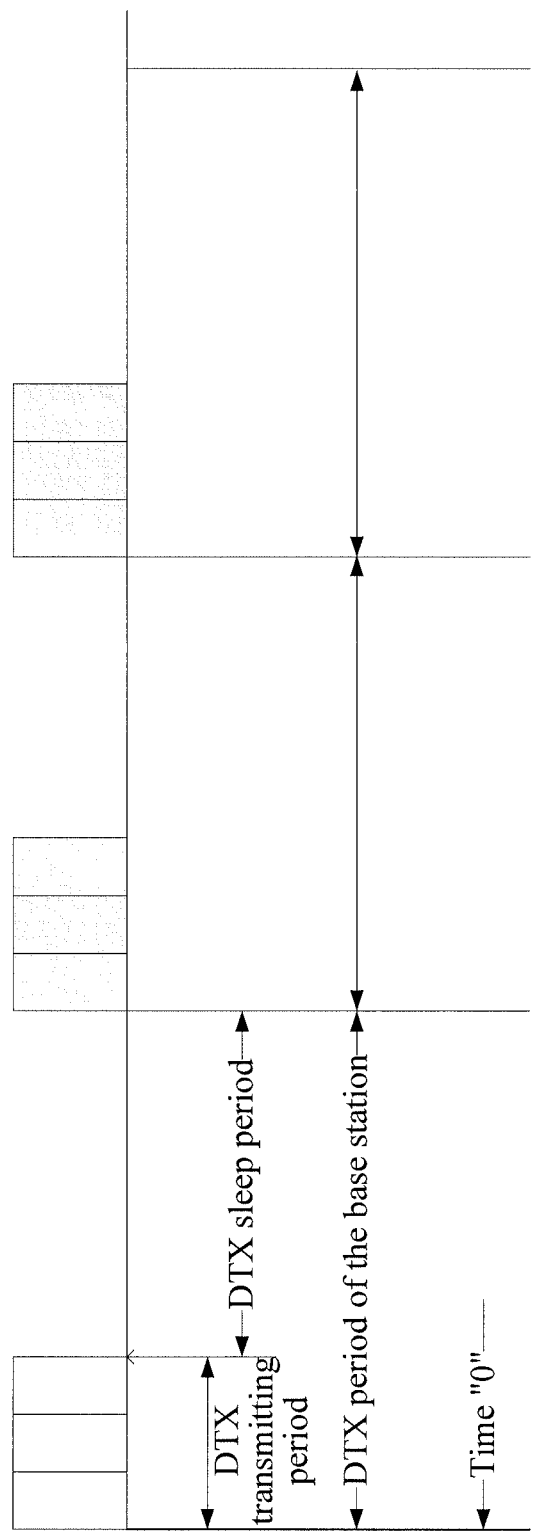
FIG. 19 is a schematic diagram of how a base station determines the base station's own DTX transmitting period and sleep period according to DRX parameter adjusted for all terminals according to another embodiment of the present invention.

The base station adjusts its own DTX transmitting period and DTX sleep period according to the adjusted DRX period, so that the receiving period of each terminal falls within the DTX transmitting period of the base station, and that the DTX sleep period of each terminal falls within the DTX sleep period of the base station. The adjustment is detailed in FIG. 19.

Steps 1204, 1205 and 1206 are respectively similar to steps 104, 105 and 106 in the previous embodiment.

The base station performs uniform adjustment according to the DRX period and the DRX bias of each terminal so that the DRX receiving period of each terminal falls within the DTX transmitting period of the base station. When all terminals are in the DRX sleep period, the base station enters the DTX sleep period, shuts down the transceiver, stops sending data, and buffers the service data and control information. When the terminal gets into the DRX receiving period, the base station resumes sending of the buffered service data and control information, which saves power and time-frequency resources, reduces interference on neighboring cells and avoids starting up and shutting down the transceiver frequently on the base station side.

A home base station is provided in the fourth embodiment of the present invention.

Figure 20A:
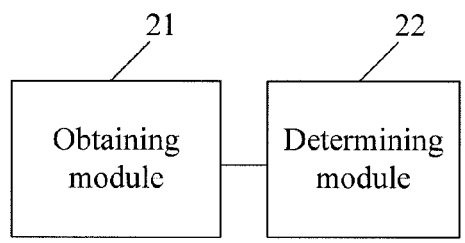
FIG. 20*a* is a schematic diagram of a structure of a base station according to an embodiment of the present invention.

As shown in FIG. 20a, the home base station includes:

an obtaining module 21, configured to obtain a DRX parameter of a terminal; and a determining module 22, configured to determine a DTX parameter of the base station according to the DRX parameter obtained by the obtaining module.

Figure 20B:
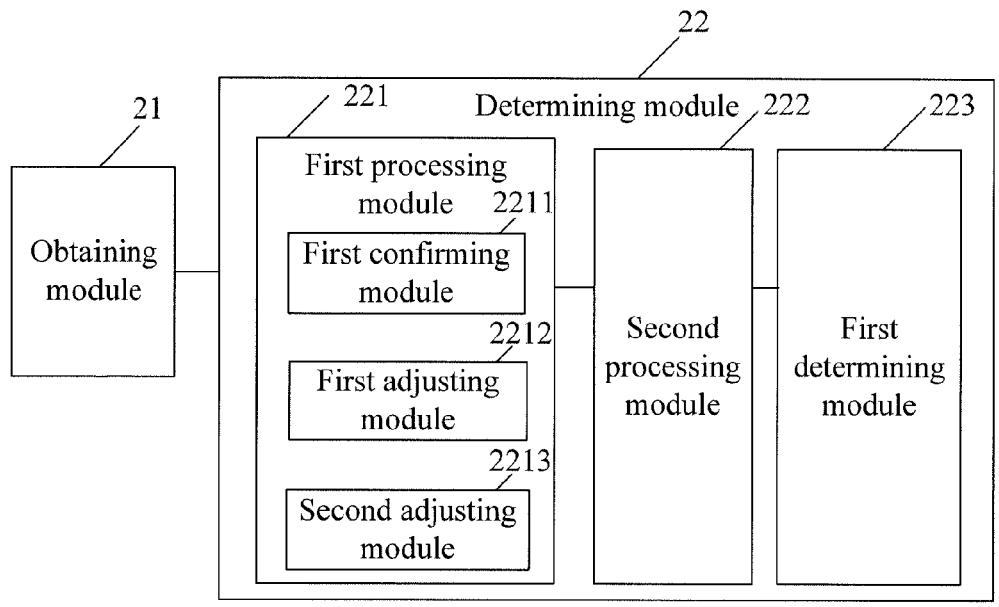
FIG. 20*b* is a schematic diagram of another structure of a base station according to an embodiment of the present invention.

As shown in FIG. 20b, the determining module includes a first processing module 221, a second processing module 222, and a first determining module 223. The details are described below:

The first processing module 221 is configured to adjust or confirm the DRX parameter of the terminal.

The second processing module 222 is configured to determine the DTX parameter of the base station according to the DRX parameter adjusted or confirmed by the first processing module.

The first determining module 223 is configured to adjust the DTX transmitting period and sleep period of the base station according to the adjusted or confirmed DRX period parameter and the DRX bias parameter, so that the receiving periods of all terminals fall within the transmitting period of the base station.

The first processing module 221 includes:

a first confirming module 2211, configured to confirm the DRX parameter of the terminal if the following conditions are fulfilled: the DRX period parameter of the terminal is the same as the period parameter of other terminal which are already in the DRX mode, and the DRX bias parameter of the terminal is different from the bias parameter of other terminal which are already in the DRX mode; or the DRX period parameter of the terminal is different from the period parameter of other terminal which are already in the DRX mode;

a first adjusting module 2212, configured to adjust the DRX parameter of the terminal if the following conditions are fulfilled: The DRX period parameter of the terminal is the same as the period parameter of other terminal which are already in the DRX mode, and the DRX bias parameter of the terminal is the same as the DRX bias parameter of other terminal which are already in the DRX mode; and a second adjusting module 2213, configured to adjust the DRX periods of all terminals to the same value and adjust the DRX biases of all terminals to be adjacent to each other but not overlapped.

In a home base station environment, after obtaining the DRX parameter of the terminal, the base station determines the DTX parameter of the base station according to the DRX parameter, and enters the DTX mode. When all user terminals served by the home base station are in the DRX sleep mode, the base station also enters the DTX sleep period. That is, the base station sends no pilot or broadcast information and shuts down the transceiver, thus saving power and time-frequency resources, reducing interference on neighboring cells, and reducing the power consumption.

After reading the foregoing embodiments, those skilled in the art are clearly aware that the embodiments of the present invention may implemented through hardware, or, preferably in most circumstances, through software in addition to a necessary universal hardware platform. Therefore, the essence or contributions to the prior art of the technical solution under the present invention may embodied in a software product. The software product may stored in computer-readable storage media and incorporate several instructions for instructing a computer device (for example, a personal computer, a server, or a network device) to execute the method specified in any embodiment of the present invention.

Although the invention is described through some exemplary embodiments, the invention is not limited to such embodiments. It is apparent that those skilled in the art may make modifications and variations to the invention without departing from the spirit and scope of the invention. The invention is intended to cover the modifications and variations provided that they fall within the protection scope defined by the following claims or their equivalents.

What is claimed is:

1. A method for sending information, comprising:
obtaining a discontinuous reception (DRX) parameter of a terminal;
determining a discontinuous transmission (DTX) parameter of a base station according to the DRX parameter of the terminal; and
sending pilot and broadcast information periodically according to the DTX parameter of the base station;
wherein the DRX parameter comprises a DRX period parameter and a DRX bias parameter, and the determining the DTX parameter of the base station according to the DRX parameter comprises:
adjusting or confirming the DRX parameter of the terminal; and
determining the DTX parameter of the base station according to the confirmed or adjusted DRX parameter.

2. The method according to claim 1, wherein the confirming the DRX parameter of the terminal comprises:
confirming the DRX parameter of the terminal if the following conditions are fulfilled: the DRX period parameter of the terminal is the same as that of other terminal which are already in a DRX mode, and the DRX bias parameter of the terminal is different from that of other terminal which are already in the DRX mode.

3. The method according to claim 1, wherein the confirming the DRX parameter of the terminal comprises:
the DRX period parameter of the terminal is different from that of other terminal which are already in the DRX mode.

4. The method according to claim 1, wherein the adjusting the DRX parameter of the terminal comprises:
mapping the DRX bias of the terminal to a bias not occupied by other terminal if determining that the DRX period parameter of the terminal is the same as that of other terminal which are already in a DRX mode and that the DRX bias parameter of the terminal is the same as that of other terminal which are already in the DRX mode.

5. The method according to claim 1, wherein the adjusting the DRX parameter of the terminal comprises:
adjusting the DRX periods of all terminals to the same value, and
adjusting the DRX biases of all terminals to be adjacent to each other but not overlapped.

6. The method according to claim 1, wherein the determining the DTX parameter of the base station according to the adjusted or confirmed DRX parameter comprises:
adjusting a DTX transmitting period and a DTX sleep period of the base station according to the adjusted or confirmed DRX period parameter and DRX bias parameter;
before sending the pilot and broadcast information periodically, the method further comprises:
adjusting receiving periods of all terminals to values that fall within the transmitting period of the base station;
the step of sending the pilot and broadcast information periodically comprises:
sending the pilot and broadcast information periodically in the transmitting period.

7. The method according to claim 1, further comprising:
sending the adjusted or confirmed DRX parameter to the terminal.

8. A base station, comprising:
a processor configured to:
obtain a discontinuous reception (DRX) parameter of a terminal; and
determine a discontinuous transmission (DTX) parameter of the base station according to the obtained DRX parameter of the terminal by:
adjusting or confirming the DRX parameter of the terminal, and
determining the DTX parameter of the base station according to the DRX parameter adjusted or confirmed.

9. The base station according to claim 8, wherein the processor is further configured to:
confirm the DRX parameter of the terminal if the following conditions are fulfilled: a DRX period parameter of the terminal is the same as a period parameter of other terminal which are already in a DRX mode, and a bias parameter of the terminal is different from bias parameter of other terminal which are already in the DRX mode; and
map the DRX bias of the terminal to a bias not occupied by other terminal if determining that the DRX period parameter of the terminal is the same as the period parameter of other terminal which are already in the DRX mode and the DRX bias parameter of the terminal is the same as the DRX bias parameter of other terminal which are already in the DRX mode.

10. The base station according to claim 8, wherein the processor is further configured to:
the DRX period parameter of the terminal is different from the period parameter of other terminal which are already in the DRX mode; and
map the DRX bias of the terminal to a bias not occupied by other terminal if determining that the DRX period parameter of the terminal is the same as the period parameter of other terminal which are already in the DRX mode and the DRX bias parameter of the terminal is the same as the DRX bias parameter of other terminal which are already in the DRX mode.

11. The base station according to claim 8, wherein the processor is further configured to:
adjust DRX periods of all terminals to the same value and adjust biases of all terminals to be adjacent to each other but not overlapped.

12. The base station according to claim 8, wherein the processor is further configured to:
adjust a DTX transmitting period and a DTX sleep period of the base station according to the adjusted or confirmed DRX period parameter and bias parameter obtained, so that receiving periods of all terminals fall within the transmitting period of the base station.

13. The base station according to claim 8, further comprising:
a transmitter, configured to send pilot and broadcast information periodically according to the DTX parameter of the base station.

14. The base station according to claim 8, further comprising:
the transmitter, configured to send the adjusted or confirmed DRX parameter to the terminal.

15. A machine-readable storage medium having stored thereon, a computer program comprising at least one code section for distribution, the at least one code section being executable by a machine for causing the machine to perform acts of:
obtaining a discontinuous reception (DRX) parameter of a terminal;
determining a discontinuous transmission (DTX) parameter of a base station according to the DRX parameter of the terminal; and
sending pilot and broadcast information periodically according to the DTX parameter of the base station,
wherein the DRX parameter comprises a DRX period parameter and a DRX bias parameter, and the determining the DTX parameter of the base station according to the DRX parameter comprises:
adjusting or confirming the DRX parameter of the terminal; and
determining the DTX parameter of the base station according to the confirmed or adjusted DRX parameter.

* * * * *